United States Patent [19]

Pstras et al.

[11] 4,385,778

[45] May 31, 1983

[54] DEVICE FOR COMPENSATION OF THE MOVEMENT OF THE PIPELINES WHICH SUPPLY TWO GASEOUS AGENTS INTO AN INDUSTRIAL REVOLVING APPLIANCE

[75] Inventors: Zbigniew Pstras; Stanislaw Kuczera, both of Katowice, Poland

[73] Assignee: Biuro Projectow Przemyslu Metali Niezelaznych "BIPROMET", Katowice, Poland

[21] Appl. No.: 309,312

[22] Filed: Oct. 6, 1981

Related U.S. Application Data

[63] Continuation of Ser. No. 108,982, Jan. 2, 1980.

[30] Foreign Application Priority Data

Jan. 12, 1979 [PL] Poland .................................. 212793

[51] Int. Cl.³ .............................................. F16L 39/04
[52] U.S. Cl. .................................... 285/134; 285/61; 285/187
[58] Field of Search .................... 285/131, 132, 133 R, 285/61, 134, 136, 138, 165, 187, 64, 47, DIG. 5

[56] References Cited

U.S. PATENT DOCUMENTS

| | | | |
|---|---|---|---|
| 2,449,355 | 9/1948 | Wiley et al. | 285/134 |
| 3,166,344 | 1/1965 | Davis | 285/134 |
| 3,207,533 | 9/1965 | Gundy et al. | 285/47 X |
| 3,606,394 | 9/1971 | Maurer et al. | 285/134 X |
| 3,684,316 | 8/1972 | Lavender | 285/134 |

FOREIGN PATENT DOCUMENTS

| | | | |
|---|---|---|---|
| 246520 | 1/1947 | Switzerland | 285/134 |
| 261845 | 1/1971 | U.S.S.R. | 285/132 |

OTHER PUBLICATIONS

*Osnowy Metalurgii*, p. 491, drawing XV1-1, Published in Moscow 1975 in *Metalurgia*.

*Primary Examiner*—Dave Arola
*Attorney, Agent, or Firm*—Edwin E. Greigg

[57] ABSTRACT

The subject of the invention is a device for compensating for the movement of the pipelines which supply two separate gaseous agents to an industrial revolving appliance. The device possesses two independent systems of compensation positioned coaxially such that an external conduit movement compensation assembly is positioned relative to the external conduit. Each of the compensation assemblies possesses a packing comprises the body (15) and (25), the sealant (16) and (26) placed inside it and the gland (17) and (27) and two elastic collar-type articulated joints comprises elastic collars (19) and (29) and spacing rings (20) and (30), holding rings (21) and (31) and fastening rings (22) and (32).

2 Claims, 1 Drawing Figure

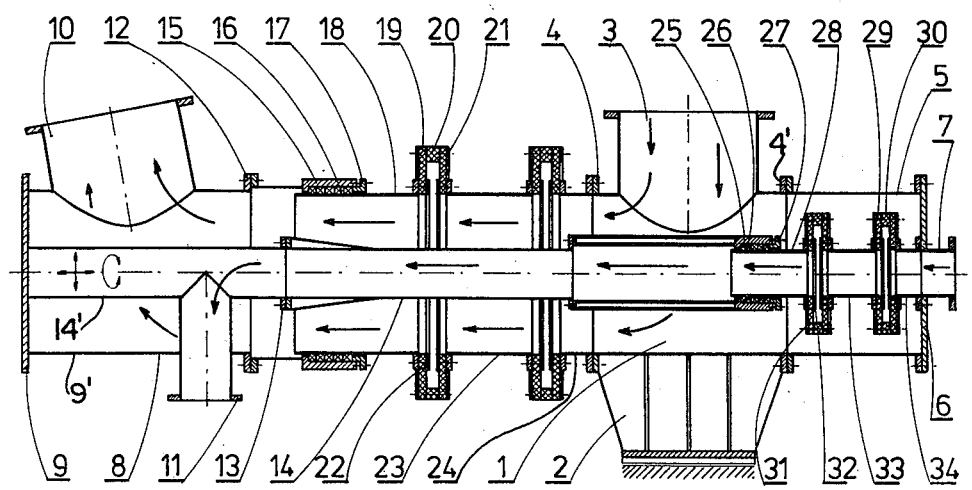

DEVICE FOR COMPENSATION OF THE MOVEMENT OF THE PIPELINES WHICH SUPPLY TWO GASEOUS AGENTS INTO AN INDUSTRIAL REVOLVING APPLIANCE

This is a continuation, of application Ser. No. 108,982 filed Jan. 2, 1980.

BACKGROUND OF THE INVENTION

The subject to the invention is a device for compensating the movement of feeding pipelines which supply two separate gaseous agents to an industrial revolving appliance.

Hitherto, in introducing two gaseous agents to an industrial revolving appliance, in which the feed lines through which the said agents are being introduced, rotate together with the appliance—e.g. the case of introducing process air to nozzles and burning air to a burner of a copper converter—one of the gaseous agents, which requires greater diameter of the pipe, is introduced axially to the revolving appliance, through a special joint, while the second is being introduced perpendicularly to the appliance axis through a flexible tubing.

The articulated joints applied to date, which introduce process air to a converter provided with two ball-and-socket joints and a packing sealed with rope seal, have three points of potential occurrence of leakage. Precise machining of mating surfaces of ball-and socket joints is required as they exhibit a tendency to seizure during operation. Moreover, the presently known articulated joint is characterized by considerable weight. Introduction of the second agent by means of a flexible hose, used so far, requires a lot of space for the hose because of the minimal radius that the hose can be bent. The possibility of application of this solution has been limited by maximum diameter of manufactured flexible tubings and has also been restricted only for the cases when the appliance revolves over the angle lesser than one full revolution.

OBJECT AND SUMMARY OF THE INVENTION

The virtue of the new device for compensation of movement of the pipelines which supply two separate gaseous agents to an industrial rotary appliance is that the device possesses two independent systems of compensation of the movement, placed coaxially with respect to each other such that the inside conduit movement compensation assembly is separate from the outside conduit. Each of the movement compensation assemblies comprises a packing body, a sealant embedded in it and the a gland; also two elastic collar joints comprises elastic collars, spacing rings, holding rings and fastening rings.

The advantage of the solution according to the invention is the ability to rotate the appliance without limitations. Another advantage is a simple design of the device, reduction of weight and dimensions and ease in its manufacturing by elimination of the ball-and-socket joints, which require precise machining.

BRIEF DESCRIPTION OF THE DRAWING

The sole FIGURE of the drawing shows a longitudinal cross-sectional view of the improved device.

DESCRIPTION OF THE PREFERRED EMBODIMENT

The device for compensating the movement of the pipelines supplying two separate gaseous agents to an industrial revolving appliance is presented in a cross-sectional view of a drawing along its length. The device comprises a fixed body 1, which rests on and is supported by a fixed support 2. The body possesses inlet connector 3 for the agent I and a collar 4 on one side of the inlet 3 and a collar 4' on the opposite side of inlet 3. On the opposite side of the collar 4' to fixed body 1, a fixed housing 5 of the movement compensation assembly of the internal conduit has been fastened to the solid body 1. A mounting plate 6 with the an inlet connector 7 for supplying agent II through a conduit coaxial with housing 5 and body 1 has been screwed on. On the opposite end of the device, a rotatable and axially movable body 8 is placed which comprises cantilever plate 9, an outer conduit 9' to which an outlet connector 10 for agent I and an outlet connector 11 for agent II are connected. The outlet 11 passes through conduit 9' and connects with coaxial conduit 14' through which agent II is conducted. The conduit 9' of movable body 8 has also the collar 12 of the outer conduit and conduit 14' is provided with a collar 13 for the inner conduit, to which the inner intermediate pipe 14 is fastened. Between the collar 12 of the external conduit of the movable body 8 and the collar 4 of the fixed body 1, the assembly for compensating movement of the external conduit has been built in. This assembly consists of the packing body 15 with the rope sealant 16 placed inside it and pressed by the gland 17 against the outer surface of the sealing connector 18. Between the sealing connector 18 and the outer intermediate conduit 23 and also between the outer intermediate conduit 23 and the fastening conduit 24, articulation joints comprises elastic rubber collars 19, rubber spacing rings 20, fastening rings 22 and holding rings 21 have been built in. Between the inner intermediate pipe 14 and the mounting plate 6, the assembly for compensation of the movement of the internal conduit has been built in . The said assembly comprises the body of packing 25 with the rope sealant 26 placed in it and pressed by the use of the gland 27 against the outer surface of the sealing connector 28. Between the sealing connector 28 and the inner intermediate conduit 33 and between the inner intermediate conduit 33 and the inner fastening conduit 34, the articulated joints comprises rubber elastic collars 29, rubber spacing rings 30, holding rings 31 and fastening rings 32 have been assembled.

The action of the device is as follows: The fixed body 1, through the support 2 is fastened to the support frame, which has been built on a foundation parallel with the axis of the revolving appliance. The movable body 8 has been fastened through the cantilever plate 9 on the revolving appliance. The fixed body 1, together with the support 2 fastened to it rigidly, the inlet connector 3, the housing 5, the mounting plate 6, the inlet connector 7, the fastening conduit 24 and the fastening conduit 34, are completely immovable and can be rigidly connected with the proper feeding conduits, supplying both of the gaseous agents to the rotary appliance. The movable body 8 with the cantilever plate 9, the outlet connector 10, the outlet connector 11, the inner intermediate pipe 14, the body of the gland 15, the rope sealant 16, the gland 17, the body of the packing 25, the rope sealant 26 and the gland 27 have been rigidly fixed to the revolving appliance for rotation therewith, hence they perform such rotary movement as the appliance itself and they can be connected rigidly with the pipe conduits and the elements placed on the revolving appliance (not shown) to which both of the gaseous agents are supplied. The rotary movement and alongside or axial movements of the revolving appliance are permitted because the body of the packing 15 can rotate and perform alongside axis movement relative to the sealing connector 18 and the body of the packing 25 can rotate and perform alongside axis movement relative to the sealing connector 28. Radial runout of the revolving appliance has been compensated because of the articulation joints in which rubber elastic collars, having the ability to strain, allow for performing the radial movements of the movable body 8, toward the solid body 1.

As shown in the drawing and described above, the device permits rotation of housing 8 which includes the outer conduit 9', outlet 10 and the gland 15. Rotatable with housing 8 is the inner conduit 14' which is connected to inner conduit 14 by flange 13 and the gland 25. The articulation joints comprising elements 19, 20, 21, 22 and 29, 30, 31, 32 are not rotatable but because of their elasticity permit slight radial movement of the rotatable elements. The body 1, support 2, housing 5, plate 6, connector 7, joints 24 and 34 are fixed and are not movable. Due to the unique construction, the device permits a connection with a rotatable device while supporting the device for slight radial movements. Not only do the glands 15, 25 permit rotational movement, the glands can slide along the surface of conduits 18 and 28 for axial movement simultaneous with rotational movement.

We claim:
1. An assembly for permitting relative rotatable and linear movement of a revolving appliance including separate coaxial inner and outer pipelines rotatable relative to fixed inner and outer coaxial pipelines for supplying two separate gaseous agents from said fixed inner and outer pipelines to said revolving appliance which comprises:
   a first fixed connector secured to said outer fixed pipeline in axial alignment therewith,
   a first packing body fixed to said outer pipeline of said revolving appliance and extending along said first fixed connector,
   a first sealant between said fixed connector and said first packing body,
   a first gland for pressing said sealant into engagement with said first fixed connector and said first packing body,
   a second fixed connector secured to said inner fixed pipeline in axial alignment therewith,
   a second packing body fixed to said inner pipeline of said revolving appliance and extending along said second fixed connector,
   a second sealant between said second fixed connector and said second packing body, and
   a second gland for pressing said second sealant into engagement with said second fixed connector and said second packing body.
2. An assembly as claimed in claim 1 in which
said first and second fixed connectors includes two elastic articulated joints,
each of said articulated joints include a pair of elastic collars separated by an elastic spacer ring, and holding rings, secured in place by fastening rings.

* * * * *